(12) United States Patent
Hakuta et al.

(10) Patent No.: US 11,536,411 B2
(45) Date of Patent: Dec. 27, 2022

(54) SILENCING TUBULAR STRUCTURE BODY

(71) Applicant: FUJIFILM Corporation, Tokyo (JP)

(72) Inventors: Shinya Hakuta, Ashigara-kami-gun (JP); Shogo Yamazoe, Ashigara-kami-gun (JP); Akihiko Ohtsu, Ashigara-kami-gun (JP); Yoshihiro Sugawara, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 395 days.

(21) Appl. No.: 16/829,999

(22) Filed: Mar. 25, 2020

(65) Prior Publication Data

US 2020/0224810 A1    Jul. 16, 2020

Related U.S. Application Data

(63) Continuation of application No. PCT/JP2018/036848, filed on Oct. 2, 2018.

(30) Foreign Application Priority Data

Oct. 3, 2017 (JP) .............................. JP2017-193404

(51) Int. Cl.
*F16L 55/033* (2006.01)
*G10K 11/162* (2006.01)
*G10K 11/172* (2006.01)

(52) U.S. Cl.
CPC ....... *F16L 55/0336* (2013.01); *F16L 55/0338* (2013.01); *G10K 11/162* (2013.01); *G10K 11/172* (2013.01)

(58) Field of Classification Search
CPC .................................................. H04R 2499/13
USPC ...................................................... 381/86, 94.1
See application file for complete search history.

(56) References Cited

U.S. PATENT DOCUMENTS

| | | | |
|---|---|---|---|
| 2005/0161283 A1* | 7/2005 | Emler | F01N 1/023 181/227 |
| 2006/0131104 A1 | 6/2006 | Yamaguchi et al. | |
| 2007/0163533 A1 | 7/2007 | Nakayama et al. | |

(Continued)

FOREIGN PATENT DOCUMENTS

| | | |
|---|---|---|
| JP | 2-71300 A | 3/1990 |
| JP | 5-133664 A | 5/1993 |

(Continued)

OTHER PUBLICATIONS

Japanese Office Action for corresponding Japanese Application No. 2019-546723, dated Mar. 16, 2021, with English translation.

(Continued)

*Primary Examiner* — Alexander Krzystan
(74) *Attorney, Agent, or Firm* — Birch, Stewart, Kolasch & Birch, LLP

(57) ABSTRACT

Provided is a silencing tubular structure body that has high strength and can be disposed in a narrow space. A tubular member including a tubular portion having a tubular shape, and a frame portion having at least a part formed integrally with an inner peripheral surface side of the tubular portion; and a lid member that is exchangeably disposed on an opening surface of the frame portion of the tubular member are included, in which the frame portion and the lid member form a resonant silencing structure.

10 Claims, 8 Drawing Sheets

(56) References Cited

U.S. PATENT DOCUMENTS

| | | | |
|---|---|---|---|
| 2007/0187174 A1* | 8/2007 | Mayor | F01N 13/002 |
| | | | 181/250 |
| 2008/0053749 A1* | 3/2008 | Utsunomiya | G03B 21/16 |
| | | | 181/284 |
| 2009/0223738 A1* | 9/2009 | Nakamura | G10K 11/172 |
| | | | 181/175 |
| 2010/0263963 A1 | 10/2010 | Honji | |
| 2012/0193221 A1* | 8/2012 | McCutchen | F01N 5/04 |
| | | | 55/385.3 |
| 2013/0202148 A1* | 8/2013 | Grupp | F01N 13/1866 |
| | | | 381/389 |
| 2015/0345497 A1 | 12/2015 | Lucas et al. | |
| 2017/0167333 A1* | 6/2017 | Masui | F01N 3/2885 |
| 2017/0221469 A1 | 8/2017 | Ishida et al. | |
| 2018/0114517 A1 | 4/2018 | Yamazoe et al. | |
| 2019/0206380 A1* | 7/2019 | Hakuta | F24F 13/02 |
| 2020/0224810 A1* | 7/2020 | Hakuta | F16L 55/0338 |

FOREIGN PATENT DOCUMENTS

| | | |
|---|---|---|
| JP | 2001-41021 A | 2/2001 |
| JP | 2003-65173 A | 3/2003 |
| JP | 2004-264372 A | 9/2004 |
| JP | 2007-270687 A | 10/2007 |
| JP | 2010-271700 A | 12/2010 |
| JP | 2013-218026 A | 10/2013 |
| JP | 2015-206929 A | 11/2015 |
| JP | 2016-20584 A | 2/2016 |
| JP | 2016-95070 A | 5/2016 |
| JP | 2016-170194 A | 9/2016 |
| JP | 2017-15972 A | 1/2017 |
| JP | 2017-138580 A | 8/2017 |
| WO | WO 2009/110344 A1 | 9/2009 |
| WO | WO 2017/030208 A1 | 2/2017 |

OTHER PUBLICATIONS

International Prelininary Report on Patentability dated Dec. 3, 2019 for Application No. PCT/JP2018/036848, along with an English translation.

International Search Report dated Dec. 18, 2018 for Application No. PCT/JP2018/036848, along with an English translation.

\* cited by examiner

SILENCING TUBULAR STRUCTURE BODY

CROSS-REFERENCE TO RELATED APPLICATIONS

This application is a Continuation of PCT International Application No. PCT/JP2018/036848 filed on Oct. 2, 2018, which claims priority under 35 U.S.C. § 119(a) to Japanese Patent Application No. 2017-193404 filed on Oct. 3, 2017. The above application is hereby expressly incorporated by reference, in its entirety, into the present application.

BACKGROUND OF THE INVENTION

1. Field of the Invention

The present invention relates to a silencing tubular structure body.

2. Description of the Related Art

In a tubular member such as a ventilation sleeve provided for ventilation in a wall of a house and a muffler for exhausting gases from a vehicle engine, sound at a specific frequency is transmitted depending on the length of the tubular member, the diameter (opening area) of the opening portion thereof, and the like. This frequency is a frequency at which resonance occurs in the tubular member, and sound is transmitted through the inside of the tubular member at a high transmittance due to the occurrence of resonance in the tubular member.

For this reason, various types of silencing structures are disposed in the tubular member to reduce sound transmitted through the inside of the tubular member.

For example, JP2003-065173A discloses a low-noise duct including: a duct main body that forms a gas flow path; a communication short tube that is formed integrally with the duct main body to communicate therewith; a film-like sheet that closes a communication hole of the communication short tube; and a protective cap attached to the communication short tube so as to cover the film-like sheet. In JP2003-065173A, sound is absorbed by a membrane vibration of the film-like sheet closing the communication short tube.

WO2009/110344A discloses a silencing structure of a ventilation tube, in which the ventilation tube is a primary side duct, a ventilation hole is provided in a peripheral wall of the primary side duct, a cover is provided outside the peripheral wall so as to cover the ventilation hole, activated carbon is stored in the cover, and a gas-permeable member is interposed between the activated carbon and the peripheral wall. In WO2009/110344A, sound is absorbed using a silencing effect of the activated carbon.

SUMMARY OF THE INVENTION

In the low-noise duct described in JP2003-065173A, an opening is provided in a part of the outer peripheral surface of the duct main body, and the communication short tube is formed in the outer peripheral portion of the duct main body according to the position of the opening. Therefore, there is a problem that the structural strength of the duct main body is reduced. Since a space for the communication short tube is needed, there is a problem that it is often difficult to dispose the low-noise duct in an electronic device, a vehicle, or the like having a small space.

In the silencing structure of the ventilation tube described in WO2009/110344A, the cover that accommodates the activated carbon is provided on the outer peripheral portion of the ventilation tube. In order to cause the ventilation tube and the inside of the cover that accommodates the activated carbon to communicate with each other, there is a need to provide an opening in the outer peripheral portion of the ventilation tube (refer to (b) of FIG. 4 and the like in WO2009/110344A). Therefore, there is a problem that the structural strength of the ventilation tube is reduced. Since a space for the cover portion is needed, there is a problem that it is often difficult to dispose the silencing structure in an electronic device, a vehicle, or the like having a small space.

An object of the present invention is to solve the above problems of the related art, and to provide a silencing tubular structure body that has high strength and can be disposed in a narrow space.

The present inventors have conducted intensive studies to solve the above problems, and as a result, found that the above problems can be solved by providing a tubular member including a tubular portion having a tubular shape, and a frame portion having at least a part formed integrally with an inner peripheral surface side of the tubular portion, and a lid member that is exchangeably disposed on an opening surface of the frame portion of the tubular member, and forming a resonant silencing structure by the frame portion and the lid member, whereby the present invention was completed.

That is, it was found that the above problems can be solved by the following configurations.

[1] A silencing tubular structure body comprising:
a tubular member including a tubular portion having a tubular shape, and a frame portion having at least a part formed integrally with an inner peripheral surface side of the tubular portion; and
a lid member that is exchangeably disposed on an opening surface of the frame portion of the tubular member,
in which the frame portion and the lid member form a resonant silencing structure.

[2] The silencing tubular structure body according to [1], in which the lid member is a plate-like member that is smaller than the opening surface of the frame portion and covers a part of the opening surface, and
the silencing structure is a resonant structure having a hollow portion surrounded by the frame portion and the lid member, and an opening portion of the opening surface that is not covered by the lid member.

[3] The silencing tubular structure body according to [1], in which the lid member has an opening portion, and
the silencing structure is a resonant structure having a hollow portion surrounded by the frame portion and the lid member, and an opening portion formed in the lid member.

[4] The silencing tubular structure body according to [1], in which the frame portion has an opening portion, and
the silencing structure is a resonant structure having a hollow portion surrounded by the frame portion and the lid member, and an opening portion formed in the frame portion.

[5] The silencing tubular structure body according to any one of [2] to [4], in which resonance in the resonant structure is air column resonance.

[6] The silencing tubular structure body according to any one of [2] to [4], in which resonance in the resonant structure is Helmholtz resonance.

[7] The silencing tubular structure body according to [1], in which the lid member is a film-like member capable of performing membrane vibration, and the silencing structure is a resonant structure in which the film-like member disposed on the opening surface of the frame portion performs membrane vibration.

[8] The silencing tubular structure body according to any one of [2] to [7], in which the resonant structure resonates with a sound in an audible range.

[9] The silencing tubular structure body according to any one of [1] to [8], in which the silencing structure is disposed at a position which is an antinode of a sound pressure of a sound resonating in the tubular portion.

[10] The silencing tubular structure body according to any one of [1] to [9], in which a material of the lid member is the same as a material of the frame portion.

[11] The silencing tubular structure body according to any one of [1] to [10], in which a porous sound absorber is present inside or outside the resonant silencing structure.

According to the present invention, it is possible to provide a silencing tubular structure body that has high strength and can be disposed in a narrow space.

BRIEF DESCRIPTION OF THE DRAWINGS

FIG. 5 is a view of FIG. 4 as viewed in a direction a.

DESCRIPTION OF THE PREFERRED EMBODIMENTS

Hereinafter, the present invention will be described in detail.

Descriptions of the constituent elements described below may be made based on representative embodiments of the present invention, but the present invention is not limited to such embodiments.

In the present specification, a numerical range expressed using "to" means a range including numerical values described before and after "to" as a lower limit and an upper limit.

Furthermore, in the present specification, for example, angles such as "45°", "parallel", "perpendicular" or "orthogonal" are within a range in which the difference from a strict angle is less than 5 degrees unless otherwise specified. The difference from a strict angle is preferably less than 4 degrees, and more preferably less than 3 degrees.

[Silencing Tubular Structure Body]

A silencing tubular structure body of an embodiment of the present invention comprises:

a tubular member including a tubular portion having a tubular shape, and a frame portion having at least a part formed integrally with an inner peripheral surface side of the tubular portion; and a lid member that is exchangeably disposed on an opening surface of the frame portion of the tubular member, in which the frame portion and the lid member form a resonant silencing structure.

An example of the silencing tubular structure body of the embodiment of the present invention will be described with reference to FIGS. 1 to 3.

Figure 1:
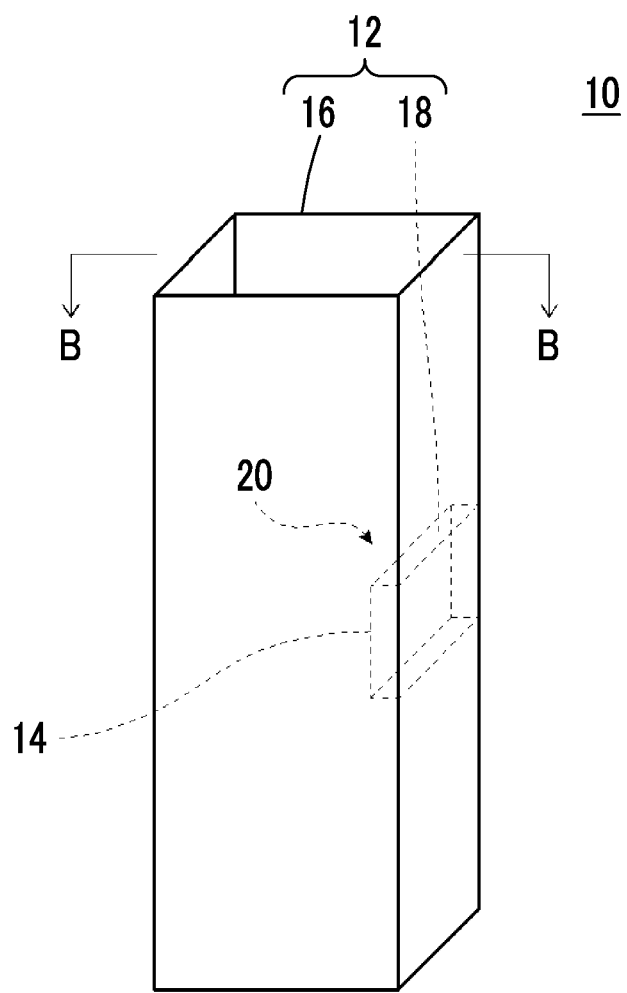
FIG. 1 is a schematic perspective view illustrating an example of a silencing tubular structure body of the present invention.

FIG. 1 is a schematic perspective view illustrating the example of the silencing tubular structure body of the embodiment of the present invention. FIG. 2 is a cross-sectional view taken along the line B-B of the silencing tubular structure body illustrated in FIG. 1. FIG. 3 is a perspective view illustrating a sound absorbing mechanism included in the silencing tubular structure body illustrated in FIG. 1.

Figure 2:
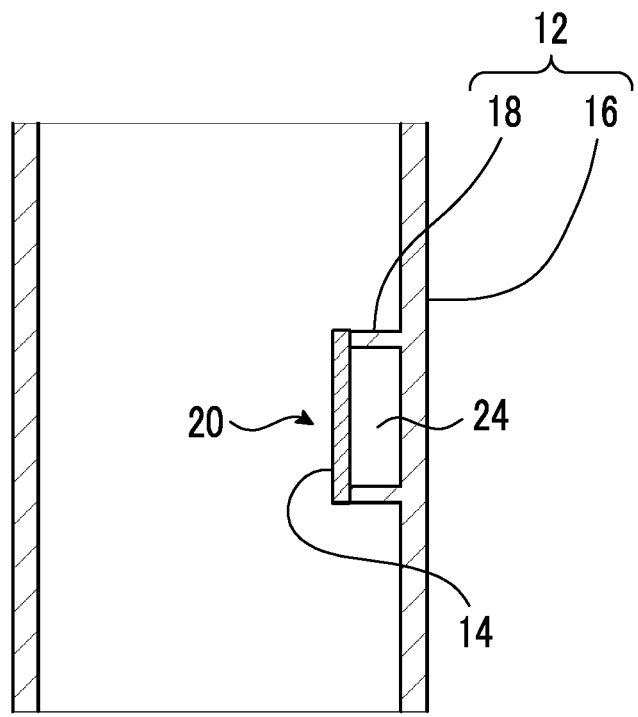
FIG. 2 is a cross-sectional view taken along the line B-B in FIG. 1.

As illustrated in FIGS. 1 and 2, a silencing tubular structure 10 includes a tubular member 12 and a lid member 14.

Figure 4:
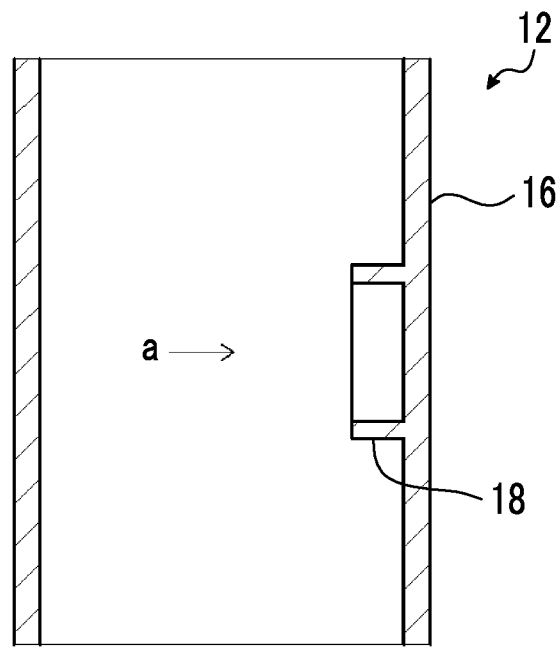
FIG. 4 is a cross-sectional view schematically illustrating an example of a tubular member.
Figure 5:
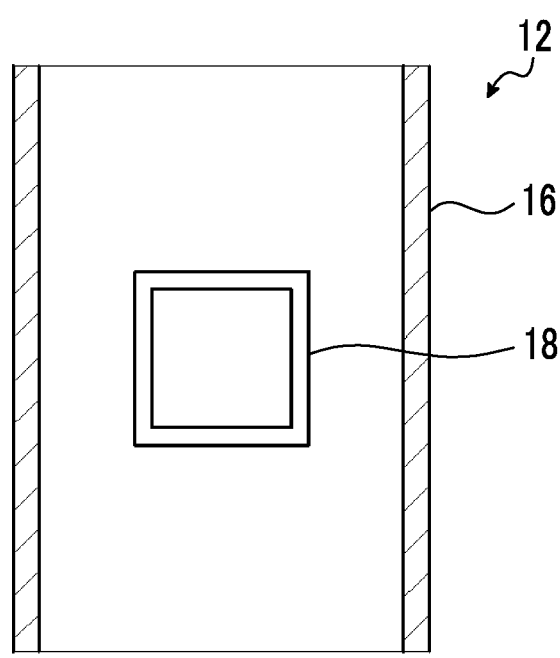

FIG. 4 is a cross-sectional view schematically illustrating an example of the tubular member. FIG. 5 is a cross-sectional view of FIG. 4 as viewed in a direction a.

As illustrated in FIGS. 4 and 5, the tubular member 12 includes a tubular portion 16 having a tube shape with both open bottom surfaces, and a frame portion 18 formed integrally with the inner peripheral surface side of the tubular portion 16.

The tubular portion 16 is a tubular portion in which the cross-sectional shape (shape of the cross section of the opening) perpendicular to the center axis direction of the tube is rectangular.

The frame portion 18 is a frame-shaped portion having a height in a direction perpendicular to one surface on the inner surface (inner peripheral surface) of the tubular portion 16. In other words, the frame portion 18 has a cubic shape and a shape having an opening that penetrates one surface, one side surface of the opening (opening surface) being closed by the inner peripheral surface of the tubular portion 16.

The tubular portion 16 and the frame portion 18 are integrally formed. That is, the tubular portion 16 and the frame portion 18 are integrally formed without using an adhesive or a mechanical connection method.

The lid member 14 is a plate-like member, and is disposed on the opening surface of the frame portion 18.

Figure 3:
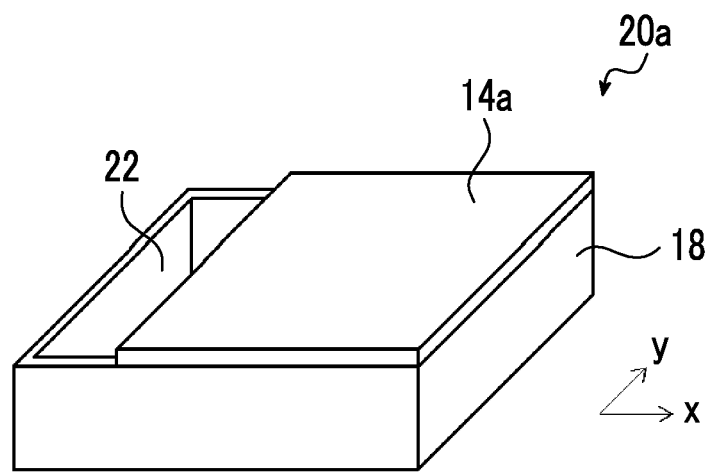
FIG. 3 is a perspective view schematically illustrating a silencing structure.

In the example illustrated in FIG. 3, a lid member 14a has a quadrangular planar shape, is smaller than the opening surface of the frame portion 18, and is disposed so as to cover a part of the opening surface. Specifically, the length of the lid member 14a in a y direction in FIG. 3 is substantially the same as the length of the frame portion 18, and the length thereof in an x direction is shorter than the length of the frame portion 18.

In the present invention, the frame portion 18 of the tubular member 12 and the lid member 14 form a silencing structure 20. The silencing structure 20 is a structure that exhibits at least one of sound absorption or reflection functions to reduce sound.

In a silencing structure 20a illustrated in FIG. 3, the lid member 14a covers the entire opening surface of the frame portion 18 in they direction in FIG. 3, and covers only a part of the opening surface of the frame portion 18 in the x direction. Accordingly, the silencing structure 20a is a configuration having a hollow portion 24 surrounded by the frame portion 18 and the lid member 14a, and an opening portion 22 of the opening surface of the frame portion 18 that is not covered by the lid member 14a. The opening portion 22 causes the hollow portion 24 to communicate with the outside.

The silencing structure 20a having such a configuration is a resonant structure that generates air column resonance or Helmholtz resonance.

As is well known, silencing by a resonant structure is to selectively reduce a sound at a specific frequency (frequency band) using a resonance phenomenon.

Air column resonance is a phenomenon in which a standing wave is generated in an open tube or a closed tube according to the length of the tube such that resonance occurs. Helmholtz resonance is a phenomenon in which the air in an opening portion functions as a mass, and the air inside a container having the opening portion plays a role as a spring and resonates.

In a case where the silencing structure 20a illustrated in FIG. 3 is used as a resonant structure in which air column resonance occurs, the frame portion 18 and the lid member 14a act as a closed tube to generate a standing wave in the hollow portion 24 such that resonance occurs.

Therefore, in the case where the silencing structure 20a is used as the resonant structure in which air column resonance occurs, the resonant frequency of the air column resonance may be appropriately set so as to reduce the sound that resonates in the tubular portion. The resonant frequency of the air column resonance is determined by the length of the tube (depth from the opening portion 22), opening end correction (corresponding to the size of the opening portion 22), and the like. By adjusting the depth of the hollow portion 24, the size of the opening portion 22, and the like, the frequency of the resonating sound can be appropriately set.

In a case where the silencing structure 20a illustrated in FIG. 3 is used as a resonant structure in which Helmholtz resonance occurs, the silencing structure 20a is a structure in which the frame portion 18 and the lid member 14a act as a container, and air in the opening portion 22 plays a role as a mass (mass), air in the hollow portion 24 plays a role as a spring, mass-spring resonance occurs, and sound is absorbed by thermo-viscous friction near the wall of the opening portion 22.

Therefore, in the case where the silencing structure 20a is used as the resonant structure in which Helmholtz resonance occurs, the resonant frequency of the Helmholtz resonance may be appropriately set so as to reduce the sound that resonates in the tubular portion. The resonant frequency of the Helmholtz resonance is determined by the internal volume of the hollow portion 24, the area of the opening portion 22, and the like. Therefore, by adjusting the inner volume of the hollow portion 24 of the silencing structure 20a, the area of the opening portion 22, and the like, the frequency of the resonating sound can be appropriately set.

Whether the silencing structure 20 having the opening portion 22 and the hollow portion 24 becomes the resonant structure in which air column resonance occurs or the resonant structure in which Helmholtz resonance occurs is determined by the size and position of the opening portion 22, the size of the hollow portion 24, and the like. Therefore, by appropriately adjusting these, It is possible to select which of the resonant structures of the air column resonance and the Helmholtz resonance.

In case of the air column resonance, in a case where the opening portion is narrow, sound waves are reflected by the opening portion and it is difficult for the sound waves to enter the hollow portion. Therefore, it is preferable that the opening portion is wide to some extent. Specifically, in a case where the opening portion is rectangular, the length of the short side is preferably 1 mm or more, more preferably 3 mm or more, and even more preferably 5 mm or more. In a case where the opening portion is circular, the diameter is preferably within the above range.

On the other hand, in case of the Helmholtz resonance, it is necessary to generate thermo-viscous friction on the side wall of the opening portion in order to absorb sound. Therefore, it is preferable that the opening portion is narrow to some extent. Specifically, in a case where the opening portion is rectangular, the length of the short side is preferably 0.5 mm or more and 20 mm, more preferably 1 mm or more and 15 mm or less, and even more preferably 2 mm or more and 10 mm or less. In a case where the opening portion is circular, the diameter is preferably within the above range.

Thus, by the frame portion 18 of the tubular member 12 and the lid member 14a forming the silencing structure 20a, the sound passing through the inside of the tubular portion 16 can be reduced.

As described above, in the configuration in which the opening is provided in a part of the outer peripheral surface of the tubular portion and the frame portion forming the silencing structure is formed on the outer peripheral portion of the tubular portion according to the position of the opening, there is a problem that the structural strength of the tubular member is reduced. In addition, since a space for disposing the frame portion (silencing structure) is needed, there is a problem that it is often difficult to dispose the frame portion in an electronic device (for example, a copying machine), a vehicle, or the like having a small space.

Contrary to this, in the silencing tubular structure body 10 of the embodiment of the present invention, the frame portion 18 is formed integrally with the inner peripheral surface side of the tubular portion 16, and the lid member is disposed at the opening portion of the frame portion 18, whereby the silencing structure is formed. Since there is no need to form an opening in the outer peripheral surface of the tubular portion 16, the structural strength of the tubular member is not reduced, and high strength can be maintained. In addition, since the frame portion 18 is formed on the inner peripheral surface of the tubular portion 16 in a direction substantially perpendicular thereto, the rigidity of the tubular portion 16 is further increased.

In addition, since the silencing structure 20 is disposed inside the tubular structure, no space is needed for disposing the silencing structure 20, and the disposition is easy even in an electronic device, a vehicle, or the like having a small space.

Here, the silencing structure 20a having the above-described resonant structure preferably resonates with sound in the audible range. In the present invention, the audible range is from 20 Hz to 20000 Hz. The silencing structure 20a more preferably resonates with a more audible sound of 100 Hz to 16000 Hz, and even more preferably resonates with a sound of 200 Hz to 12000 Hz.

In the tubular portion 16, the sound easily passes in a frequency band of the resonant frequency of the sound resonating in the tubular portion 16. Therefore, it is preferable that the silencing structure 20a reduces sound at the resonant frequency in the tubular portion 16.

In a case where the tubular portion 16 of the tubular member 12 is used by being connected to another duct or the like, the resonant frequency of the sound that resonates in the tubular portion 16 is the resonant frequency of the sound that resonates in the tubular portion 16 in a state of being connected to the other duct.

It is preferable that the silencing structure 20a is disposed at the position of the antinode of the sound pressure of a sound that resonates in the tubular portion 16, that is, at a position where the sound pressure becomes high. By disposing the silencing structure 20a at the position of the antinode of the sound pressure of the sound resonating in the tubular portion 16, the effect of sound absorption can be further enhanced.

Here, in the silencing tubular structure body 10 of the embodiment of the present invention, the frame portion 18 forming the silencing structure 20a is formed integrally with the tubular portion 16 on the inner peripheral surface of the tubular portion 16. Therefore, the position of the frame portion 18 on the inner peripheral surface of the tubular portion 16 is set in advance by simulation, experiment, or the like so as to be the position of the antinode of the sound resonating in the tubular portion 16.

In a case where the tubular portion 16 of the tubular member 12 is used by being connected to another duct or the like, the position of the antinode of the sound pressure is the position of the antinode of the sound pressure inside the tubular portion 16 in a state of being connected to the other duct.

As the resonance in the tubular portion 16, for example, in a case where the terminal portion of the tubular portion 16 is open, the acoustic impedance greatly changes at the portion such that reflection occurs. The reflected sound interferes with the transmitted sound in the tubular portion 16. At a specific frequency, the interference causes a standing wave to be generated in the tubular portion 16 and resonate.

In addition, since the frame portion 18 is positioned in advance and is formed integrally with the tubular portion 16 on the inner peripheral surface of the tubular portion 16, the positioning of the silencing structure 20a in the tubular portion 16 is easy.

Furthermore, since the positional accuracy of the silencing structure 20a can be significantly improved, a high sound absorbing effect can be reliably obtained. In particular, since the acoustic characteristics of the silencing structure 20a due to resonance greatly change depending on the disposition in the tubular portion 16, the positioning accuracy of the silencing structure 20a is important.

In addition, in a configuration in which a silencing structure is produced separately from a tubular portion and is disposed in the tubular portion, it is difficult to obtain the same acoustic characteristics in the case of mass production. Contrary to this, in the present invention, since the positioning can be performed easily and with high accuracy, the same acoustic characteristics can be easily and stably obtained even in the case of mass production.

In addition, since the positional deviation of the silencing structure 20a or the like does not occur, a reduction in the sound absorbing effect due to deviation from the position of the antinode of the sound pressure caused by the positional deviation can be prevented.

In the example illustrated in FIG. 3, the configuration in which the entire frame portion 18 is formed integrally with the tubular portion 16 is adopted. However, the frame portion 18 is not limited thereto, and at least a part of the frame portion 18 may be formed integrally with the tubular portion 16. For example, a configuration in which one, two, or three of the four frames constituting the frame portion 18 is formed integrally with the tubular portion 16 may be adopted.

As the material of the tubular member 12 (the tubular portion 16 and the frame portion 18), there are a metal material, a resin material, a reinforced plastic material, a carbon fiber, and the like. Examples of the metal material include metal materials such as aluminum, titanium, magnesium, tungsten, iron, steel, chromium, chromium molybdenum, nichrome molybdenum, copper, and alloys thereof. Examples of the resin material include resin materials such as an acrylic resin, polymethyl methacrylate, polycarbonate, polyamidoimide, polyarylate, polyetherimide, polyacetal, polyetheretherketone, polyphenylene sulfide, polysulfone, polyethylene terephthalate, polybutylene terephthalate, polyimide, an acrylonitrile-butadiene-styrene copolymerized synthetic resin (ABS resin), polypropylene, and triacetyl cellulose. As the reinforced plastic material, there are carbon fiber reinforced plastics (CFRP) and glass fiber reinforced plastics (GFRP). In addition, rubbers including natural rubber, chloroprene rubber, butyl rubber, ethylene propylene diene rubber (EPDM), silicone rubber, crosslinked structure bodies thereof can be adopted.

Alternatively, a structure body containing air, that is, a foam material, a hollow material, a porous material, or the like can be used. In a case where a large number of film-type soundproof structure bodies are used, a frame can be formed using, for example, a closed-cell foam material in order to prevent ventilation between cells. For example, various materials such as closed-cell polyurethane, closed-cell polystyrene, closed-cell polypropylene, closed-cell polyethylene, and closed-cell rubber sponge can be selected. The use of closed cells does not allow sound, water, gas, and the like to pass therethrough and provides high structural strength compared to open cells. Therefore, the closed cells are suitable for use as a frame material. Thus, the tubular member can be reduced in weight by using a material system containing air inside. In addition, heat insulation can be imparted.

Here, since the tubular member 12 can be used for an exhaust port or the like, the tubular member 12 is preferably made of a flame-retardant material or a material having high heat resistance. The heat resistance can be defined, for example, by a time that satisfies Article 108-2 of the Building Standard Law Enforcement Order. A case where the time to satisfy Article 108-2 of the Building Standards Law Enforcement Order is 5 minutes or longer and shorter than 10 minutes is referred to as a flame-retardant material, a case of 10 minutes or longer and shorter than 20 minutes is referred to as a semi-combustible material, and a case of 20 minutes or longer is a non-combustible material. However, heat resistance is often defined for each field. Therefore, the tubular member 12 may be made of a material having heat resistance equal to or higher than the flame retardancy defined in the field according to the field in which the silencing tubular structure body is used.

The shape of the cross section of the opening of the tubular portion 16 is not particularly limited, and for example, may be another quadrangle such as a square, a rectangle, a diamond, or a parallelogram, a triangle such as an equilateral triangle, an isosceles triangle, or a right triangle, a polygon including a regular polygon such as a regular pentagon or a regular hexagon, a circle, an ellipse, or an irregular shape.

The shape of the cross section of the opening of the frame portion 18 is not particularly limited, and for example, may be another quadrangle such as a square, a rectangle, a diamond, or a parallelogram, a triangle such as an equilateral triangle, an isosceles triangle, or a right triangle, a polygon including a regular polygon such as a regular pentagon or a regular hexagon, a circle, an ellipse, or an irregular shape.

The size (the size of the cross section of the opening), the thickness, the length, and the like of the tubular portion 16 are not particularly limited, and may be appropriately set according to the required size and the like.

The thickness (frame thickness) and height (height in a direction perpendicular to the inner peripheral surface of the tubular portion 16) of the frame portion 18 are not particularly limited as long as the lid member 14 can be reliably fixed and supported, and may be set, for example, according to the size of the cross section of the opening of the frame portion 18 or the like.

The configuration in which the tubular portion 16 and the frame portion 18 are integrally formed can be produced by compression molding, injection molding, imprinting, shaving, and a process having a simple processing method using a three-dimensional shape forming (3D) printer.

Here, it is often difficult to provide an opening in a tubular structure only by batch forming, and it is necessary to perform drilling later. In a case where processing is necessary later, positioning accuracy becomes a problem. Contrary to this, in the present invention, since the tubular portion 16 and the frame portion 18 are integrally formed, there is no problem in positioning.

As the material of the lid member 14a, the same material as the above-described material of the tubular member 12 can be used. The material of the lid member 14a and the material of the tubular member 12 may be the same or different.

In particular, the lid member 14a and the tubular member 12 made of the same material have the same characteristics with respect to heat, humidity, and the like and thus are easily handled against environmental changes. In addition, the same material is often easily adhered to each other, which is advantageous in reliably fixing the lid member to the tubular member.

The thickness of the lid member 14a is not particularly limited, and can be appropriately set according to required strength, miniaturization, and the like.

A method for fixing the lid member 14a to the frame portion 18 is not particularly limited, and a method using a double-sided tape or an adhesive, a mechanical fixing method such as screwing, pressure bonding, or the like can be appropriately used. This fixing method can also be selected from the viewpoint of heat resistance, durability, and water resistance similarly to the material of the tubular member. For example, as the adhesive, Cemedine "Super-X" series, ThreeBond "3700 series (heat resistant)", heat-resistant epoxy adhesives "Duralco series" manufactured by Taiyo Wire Cloth Co., Ltd., or the like can be selected. As the double-sided tape, 3M high temperature double-sided pressure sensitive adhesive tape 9077 or the like can be selected. Thus, various fixing methods can be selected for the required characteristics.

Here, in the silencing structure 20a illustrated in FIG. 3, the plate-like lid member 14a smaller than the opening surface of the frame portion 18 is used as the lid member 14, and the resonant structure having the opening portion 22 and the hollow portion 24 is formed by covering a part of the opening surface, but the silencing structure 20a is not limited thereto.

Figure 6:
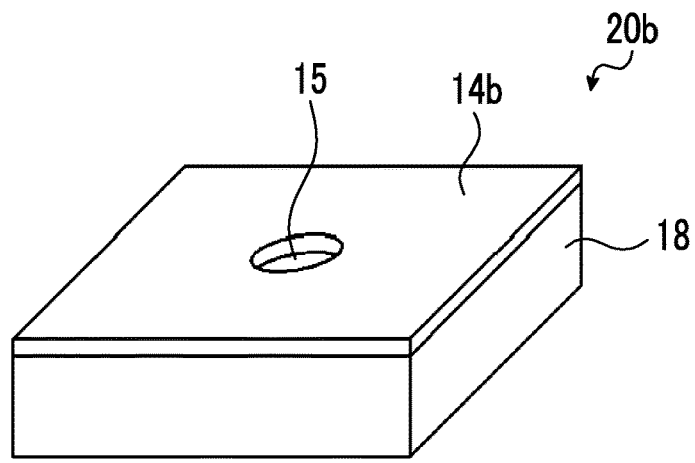
FIG. 6 is a perspective view schematically illustrating another example of the silencing structure.

For example, as in a silencing structure 20b illustrated in FIG. 6, a configuration in which a lid member 14b which is a plate-like member having a size to cover the entire opening surface of the frame portion 18 and has an opening portion 15 penetrating the member in a thickness direction is used as the lid member 14, and the lid member 14b covers the opening surface of the frame portion 18 is adopted. Accordingly, the silencing structure 20b becomes a resonant structure having the hollow portion 24 surrounded by the frame portion 18 and the lid member 14b, and the opening portion 15 formed in the lid member 14b.

The silencing structure 20b illustrated in FIG. 6 becomes a resonant structure in which air column resonance or Helmholtz resonance occurs.

In the present specification, although different reference numerals are assigned to the silencing structures having different configurations, such as 20a, 20b . . . , in a case where there is no need to distinguish these silencing structures, reference numeral 20 is assigned. Similarly, although different reference numerals are assigned to the lid members having different configurations, such as 14a, 14b, . . . , in a case where there is no need to distinguish these lid members, reference numeral 14 is assigned.

Alternatively, a configuration in which a plate-like member having a size that entirely covers the opening surface of the frame portion 18 is used as the lid member 14, an opening portion is provided in a side surface of the frame portion 18, and the opening surface of the frame portion 18 is covered by the lid member 14 may be adopted. The silencing structure 20 becomes a resonant structure having the hollow portion 24 surrounded by the frame portion 18 and the lid member 14 and the opening portion formed in the frame portion 18.

Furthermore, in the example illustrated in FIG. 1, the silencing structure 20a is the resonant structure in which air column resonance or Helmholtz resonance occurs, but is not limited thereto.

Figure 7:
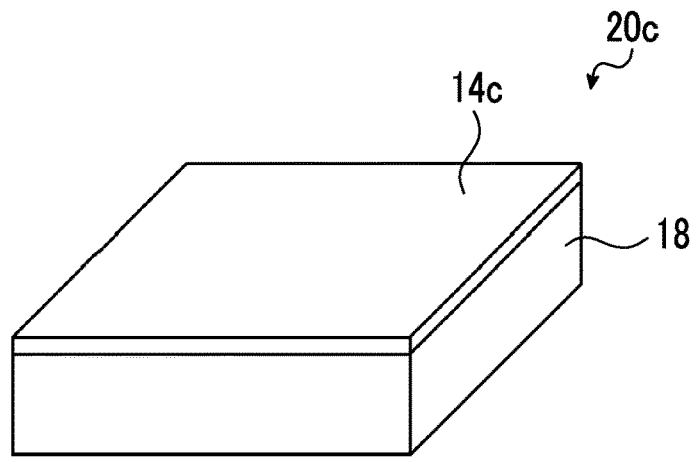
FIG. 7 is a perspective view schematically illustrating another example of the silencing structure.

For example, as in a silencing structure 20c illustrated in FIG. 7, a configuration in which a vibrating film-like lid member 14c is used as the lid member 14, and the opening surface of the frame portion 18 is covered by the lid member 14c may be adopted. The silencing structure 20c is a resonant structure in which the film-like lid member 14c is supported to oscillate by its peripheral edge portion fixed to the frame portion 18 a membrane vibration is used.

The resonant frequency of the membrane vibration of the silencing structure 20c may be appropriately set so as to reduce the sound that resonates in the tubular portion. The resonant frequency of the membrane vibration is determined by the size, thickness, hardness, and the like of the film-like lid member 14c. Therefore, by adjusting the size, thickness, hardness, and the like of the lid member 14c of the silencing structure 20c, the frequency of the resonating sound can be appropriately set.

As the material of the film-like lid member 14c, various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and resin materials such as polyethylene terephthalate (PET), triacetyl cellulose (TAC), polyvinylidene chloride (PVDC), polyethylene (PE), polyvinyl chloride (PVC), polymethylpentene (PMP), cycloolefin polymer (COP), ZEONOR, polycarbonate, polyethylene naphthalate (PEN), polypropylene (PP), polystyrene (PS), polyarylate (PAR), aramid, polyphenylen sulfide (PPS), polyether sulfone (PES), nylon, polyester (PEs), cyclic olefin copolymer (COC), diacetyl cellulose, nitrocellulose, cellulose derivatives, polyamide, polyamide imide, polyoxymethylene (POM), polyetherimide (PEI), polyrotaxane (such as a slide-ring material), and polyimide can be used. Furthermore, glass materials such as thin film glass, and fiber-reinforced plastic materials such as carbon fiber reinforced plastic (CFRP) and glass fiber reinforced plastics (GFRP) can also be used. In addition, natural rubber, chloroprene rubber, butyl rubber, EPDM, silicone rubber, and the like, and rubbers having a crosslinked structure body thereof can be used. Alternatively, a combination thereof may be used.

Alternatively, a combination thereof may be used.

In a case where a metal material is used, the surface may be plated with metal from the viewpoint of suppressing rust and the like.

The Young's modulus of the film-like lid member 14c is not particularly limited as long as the membrane vibration can occur. The Young's modulus of the film-like lid member 14c is preferably 1000 Pa to 1000 GPa, more preferably 10,000 Pa to 500 GPa, and most preferably from 1 MPa to 300 GPa.

The density of the film-like lid member 14c is not particularly limited as long as the membrane vibration can occur. The density of the film-like lid member 14c is preferably 10 kg/m$^3$ to 30,000 kg/m$^3$, more preferably 100 kg/m$^3$ to 20,000 kg/m$^3$, and most preferably 500 kg/m$^3$ to 10,000 kg/m$^3$.

The thickness of the film-like lid member 14c is not particularly limited as long as the membrane vibration can occur. For example, the thickness of the film-like lid member 14c is preferably 0.005 mm (5 µm) to 1 mm, more preferably 0.007 mm (7 µm) to 0.5 mm, and most preferably 0.01 mm (10 µm) to 0.25 mm (250 µm).

A method for fixing the film-like lid member 14a to the frame portion 18 is not particularly limited, and a method using a double-sided tape or an adhesive, a mechanical fixing method such as screwing, pressure bonding, or the like can be appropriately used.

Here, in the present invention, the lid member 14 is exchangeably attached to the frame portion 18. Therefore, by replacing the lid member 14, sounds in different frequency bands can be reduced.

In the present invention, exchangeable means that the lid member 14 and the frame portion 18 can be easily removed and attached again without damage, as in a fixing method using a double-sided tape, an adhesive, a pressure sensitive adhesive, or the like, a method of fixing from the side wall with a tape, a mechanical connection method such as screwing, a fixing method by a fitting structure, and the like.

For example, in the silencing structure 20 having the resonant structure having the opening portion as illustrated in FIGS. 3 and 6, the frequency band of the sound to be reduced can be changed by a change to a lid member 14 having a different opening portion size. In addition, in the silencing structure 20c having the film-like lid member 14c as illustrated in FIG. 7, the frequency band of the sound to be reduced can be changed by changing the lid member 14c to a lid member 14c having a different thickness, hardness, or the like. Alternatively, the lid member 14 of the silencing structure 20 having the opening portion as illustrated in FIGS. 3 and 6 may be changed to the film-like lid member 14c as illustrated in FIG. 7 to change the frequency band of the sound to be reduced.

By disposing a porous sound absorber inside or outside the above-described resonant silencing structure, it is possible to broaden the frequency band of the sound to be reduced and to provide a high frequency sound absorbing effect. For example, a lid member may be attached after a porous sound absorber is disposed inside a frame, or a lid member to which a porous sound absorbing material is attached may be attached to a frame.

The porous sound absorber is not particularly limited, and a porous sound absorber known in the related art can be appropriately used. For example, foam materials and materials containing minute air such as urethane foam, soft urethane foam, wood, ceramic particle sintered materials, and phenol foam; fibers and non-woven fabric materials such as glass wool, rock wool, microfibers (Thinsulate manufactured by 3M), floor mats, carpets, melt blown nonwoven fabrics, metal non-woven fabrics, polyester non-woven fabrics, metal wool, felt, insulation boards, and glass non-woven fabrics; wood wool cement boards; nanofiber materials such as silica nanofibers; gypsum boards; various known porous sound absorbers can be used.

The flow resistance of the porous sound absorber is not particularly limited, but is preferably 1000 to 100,000 (Pa·s/m$^2$), more preferably 5000 to 80000 (Pa·s/m$^2$), and even more preferably 10,000 to 50,000 (Pa·s/m$^2$).

While various embodiments of the silencing tubular structure body of the embodiment of the present invention have been described in detail, the present invention is not limited to these embodiments, and as a matter of course, various improvements or modifications can be made without departing from the gist of the present invention.

EXAMPLES

Hereinafter, the present invention will be described in more detail based on examples. The materials, amounts used, proportions, processing details, processing procedures, and the like described in the following examples can be changed as appropriate without departing from the intent of the present invention. Therefore, the scope of the present invention should not be construed as being limited by the following examples.

Reference Example 1

Figure 8:
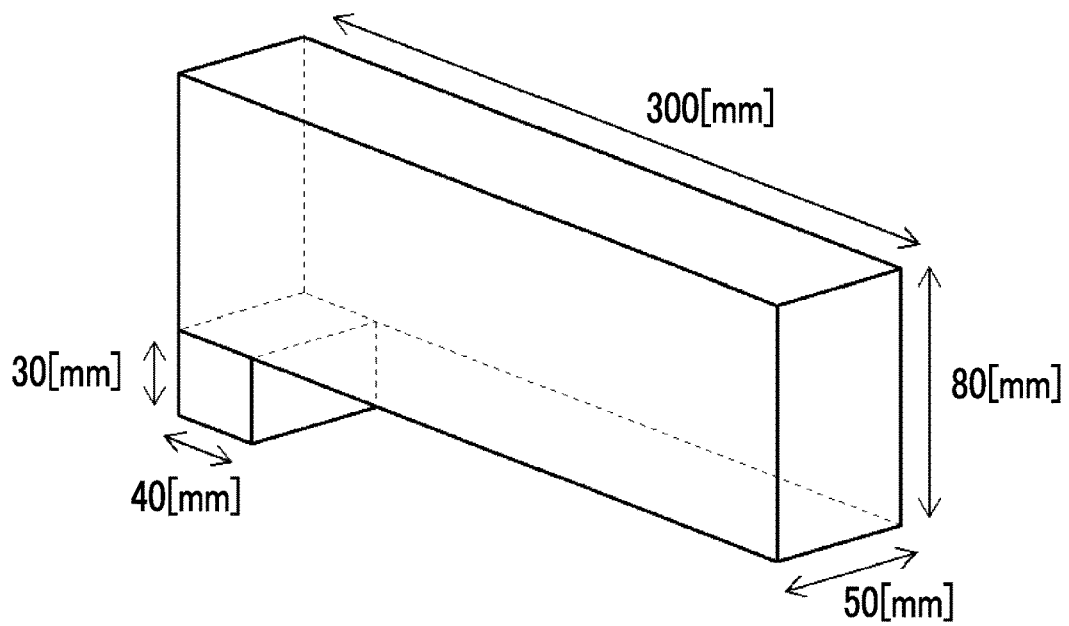
FIG. 8 is a view for describing a model of a tubular portion used for a simulation.

An L-shaped duct as illustrated in FIG. 8 was produced.

As illustrated in FIG. 8, the L-shaped duct was made of ABS, included a first tube structure having a width of 50 mm, a height of 80 mm, and a length of 300 mm and a second tube structure having a width of 50 mm, a height of 40 mm, and a length of 30 mm, and had a structure in which the second tube structure was connected to the side surface (the surface having a width of 50 mm) of an end portion of the first tube structure. That is, the length direction of the first tube structure and the length direction of the second tube structure intersect at 90°. The end face of the first tube structure in the length direction away from the second tube structure is an open end, and the end face of the second tube structure in the length direction on the side not connected to the first tube structure is an open end.

A speaker (SRS-XB10 manufactured by Sony Corporation) was disposed at the open end of the second tube structure of the L-shaped duct, and a ½-inch microphone (TYPE 7146 made by ACO Co., Ltd., hereinafter simply referred to as "microphone") was disposed at a distance of 200 mm from the open end of the first tube structure.

White noise was generated from the speaker, and the sound pressure was measured for 20 seconds with the microphone. The measured sound pressure was subjected to a fast Fourier transform (FFT), and the sound pressure for each frequency was obtained as an average value for 20 seconds. These measurement programs were created using Labview (National Instruments).

Using the result of Reference Example 1 as a reference of the sound pressure, the silencing effect in the examples of the present invention was evaluated.

Figure 9:
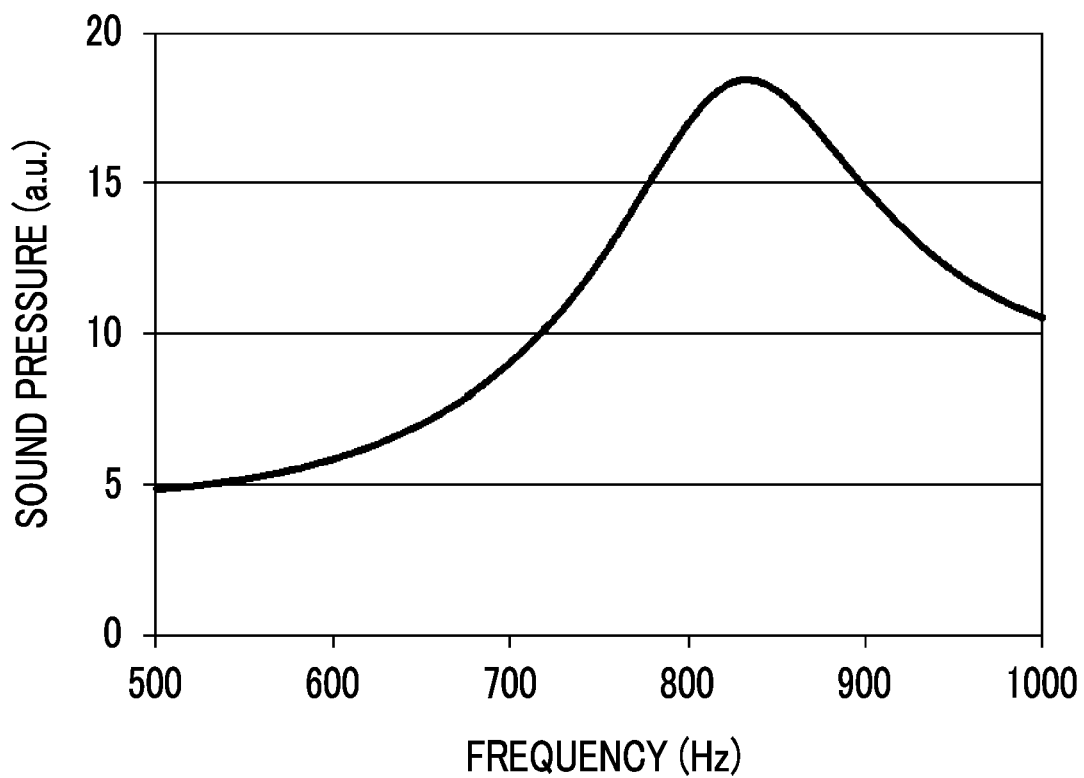
FIG. 9 is a graph showing a relationship between a frequency and a sound pressure.

First, measurement results of Reference Example 1 are shown in FIG. 9. FIG. 9 is a graph showing the relationship between the sound volume transmitted through the L-shaped duct and the frequency. Since white noise was generated, the incident sound pressure corresponds to the transmittance at each frequency. According to FIG. 9, it can be seen that in the L-shaped duct, the transmittance is highest at 810 Hz in the range of 500 Hz to 1000 Hz, and resonance transmitting at this frequency occurs.

In the following, focusing on the frequency of 810 Hz, an experiment was conducted focusing on how much the sound that is easily transmitted at the frequency of 810 Hz can be reduced.

Next, the microphone was moved inside the first tube structure while white noise was generated by the speaker, and the sound pressure distribution inside the L-shaped duct was examined.

Figure 10:
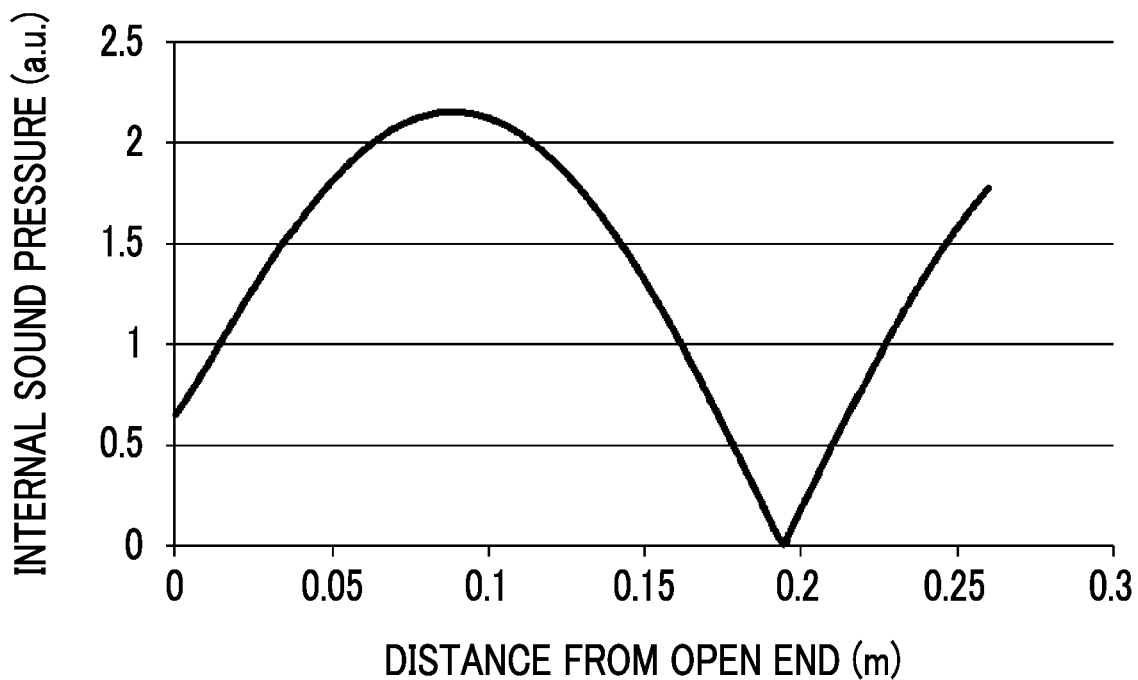
FIG. 10 is a graph showing a relationship between a distance from an open end and an internal sound pressure.

FIG. 10 shows the results at 810 Hz.

From FIG. 10, it can be seen that a mode is generated inside the L-shaped duct according to the impedance change at the open end.

Example 1

An L-shaped duct (tubular member) which was an ABS L-shaped duct of the same size as that of Reference Example 1, and had frames which had a height of 20 mm, a width of 50 mm, and a thickness of 3 mm and were formed integrally with the inner peripheral surface side of the 50 mm width surface of the first tube structure at positions 80 mm and 190 mm from the open end of the first tube structure, was produced. The production was performed using a 3D printer manufactured by XYZprinting. Since the width of the two frames formed was set to 50 mm, both ends of the two frames were in contact with the surface having a height of 80 mm, and the surface having a height of 80 mm also served as a frame portion. The frame portion was configured together with the two frames. Furthermore, portions of the L-shaped duct other than the two frames correspond to the tubular portion of the present invention.

As a lid member, an acrylic plate having a width of 50 mm and a thickness of 2 mm, in which the length in the length direction of the first tube structure was the distance between the two frames integrally formed+the frame thickness (116 mm in total), was prepared. An opening portion having a length of 20 mm was formed from a position of 3 mm to a position of 23 mm from one end of the acrylic plate in the length direction. The width of the opening portion was 44 mm, and 3 mm was left at each of both end portions in the width direction.

The acrylic plate having the opening portion was fixed to the two frames with double-sided tape. A silencing tubular structure body was produced by attaching the opening portion side as the open end side of the first tube structure.

Figure 11:
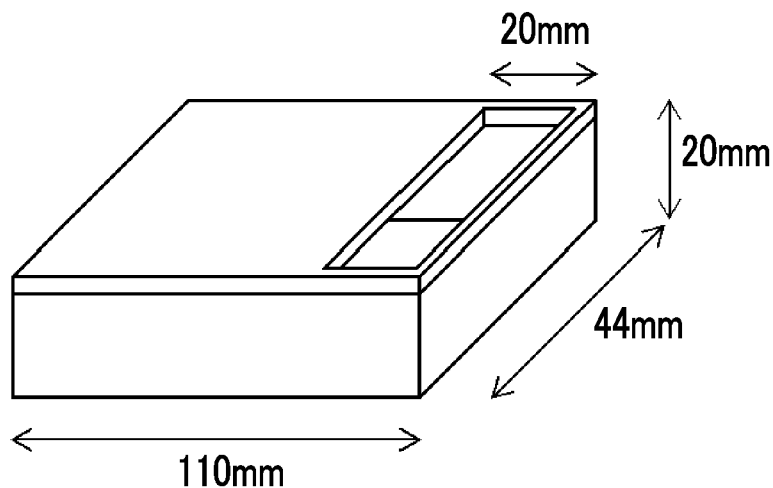
FIG. 11 is a view for describing a model of the silencing structure used in a simulation.

Accordingly, a silencing structure as illustrated in FIG. 11 was formed. The hollow portion had a length of 110 mm, a width of 50 mm, and a height of 20 mm, and the opening portion had a length of 20 mm and a width of 44 mm. This silencing structure is a resonant structure in which air column resonance occurs. The resonant frequency of this resonant structure is 810 Hz.

The sound pressure of the produced silencing tubular structure body was measured in the same manner as in Reference Example 1. In order to evaluate the silencing effect of the silencing structure, the transmission loss in Example 1 was evaluated in terms of $20 \times \log_{10}$ (the sound pressure of Reference Example 1/the sound pressure of Example 1) in units of dB.

Figure 12:
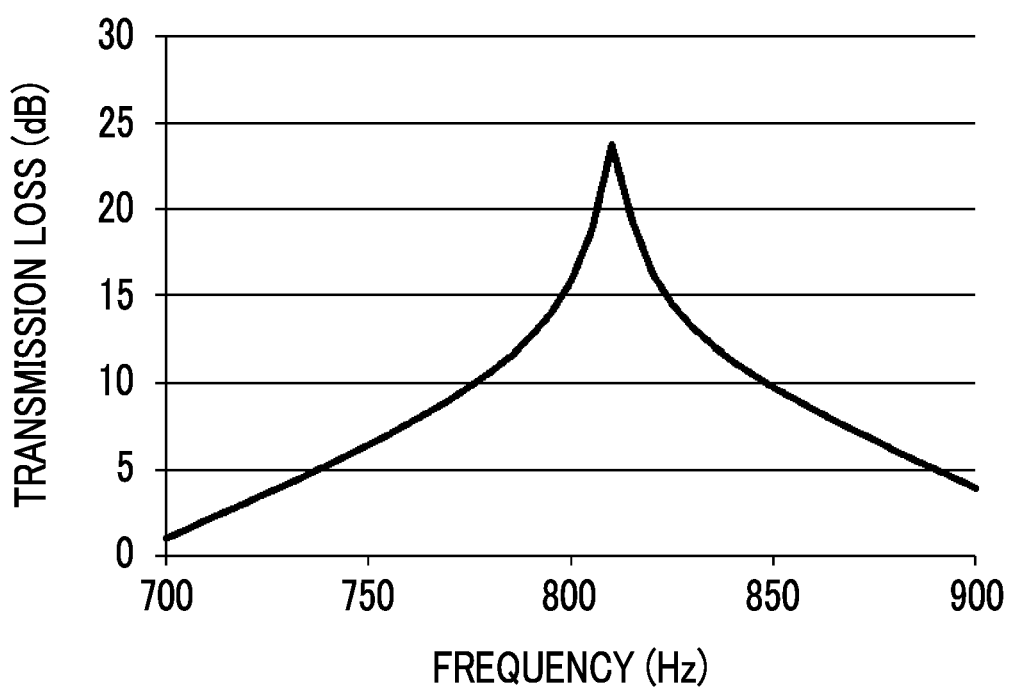
FIG. 12 is a graph showing a relationship between a frequency and a transmission loss.

The result is shown in FIG. 12.

From FIG. 12, it can be seen that a large silencing effect of about 24 dB can be obtained at 810 Hz, which is the resonant frequency of the L-shaped duct. Here, according to FIG. 10, at 810 Hz, the mode in the L-shaped duct has an antinode (the peak of the sound pressure) at a position of 90 mm from the open end. In Example 1, the opening portion of the silencing structure is formed between 80 mm and 100 mm from the open end of the L-shaped duct, and it can be seen that the opening portion is located exactly at the position of the antinode.

As described above, a large silencing effect can be obtained by disposing the opening portion at the position of the antinode of the sound pressure at the resonant frequency in the L-shaped duct.

Example 2

A silencing tubular structure body was produced in the same manner as in Example 1, except that the positions of the two frames were respectively set to positions of 70 mm and 180 mm from the open end. That is, the silencing structure is formed at a position of 70 mm from the open end of the L-shaped duct.

Figure 13:
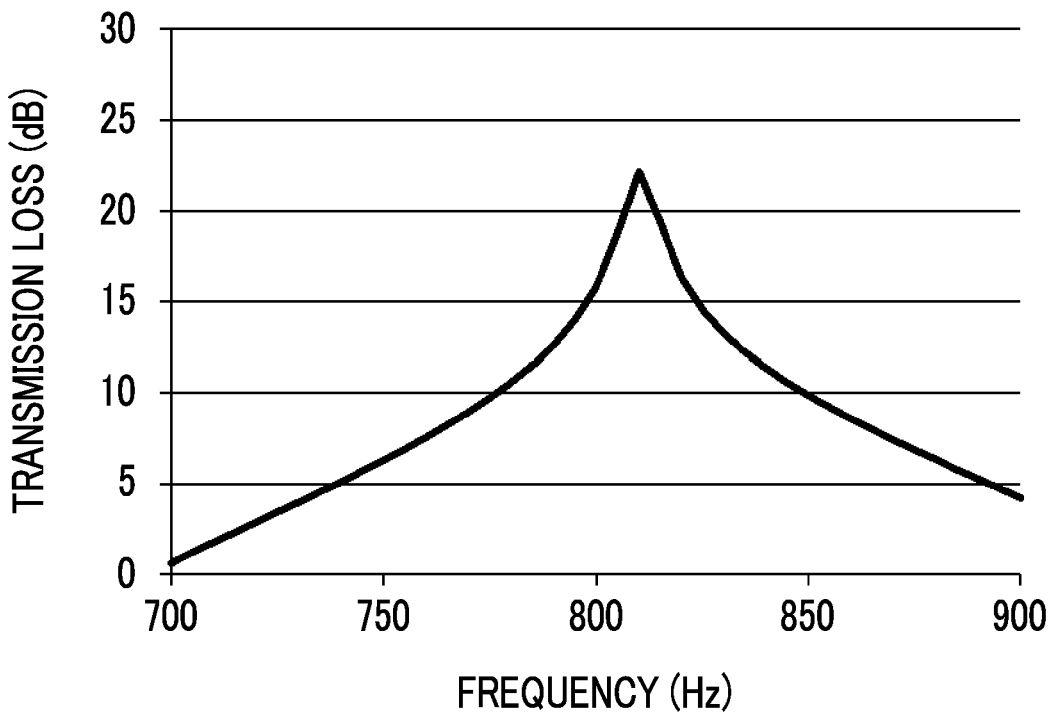
FIG. 13 is a graph showing a relationship between a frequency and a transmission loss.

The transmission loss was evaluated in the same manner as in Example 1. The results are shown in FIG. 13.

In the case of Example 2, the opening portion of the silencing structure is slightly shifted from the position of the antinode of the sound pressure. Therefore, although the transmission loss is slightly smaller than that of Example 1, it can be seen that a large silencing effect can be obtained.

Example 3

A silencing tubular structure body was produced in the same manner as in Example 1, except that the positions of the two frames were respectively set to positions of 20 mm and 130 mm from the open end. That is, the silencing structure is formed at a position of 20 mm from the open end of the L-shaped duct.

The transmission loss was evaluated in the same manner as in Example 1.

Example 4

A silencing tubular structure body was produced in the same manner as in Example 1, except that the positions of the two frames were respectively set to positions of 140 mm and 250 mm from the open end. That is, the silencing structure is formed at a position of 140 mm from the open end of the L-shaped duct.

The transmission loss was evaluated in the same manner as in Example 1.

Figure 14:
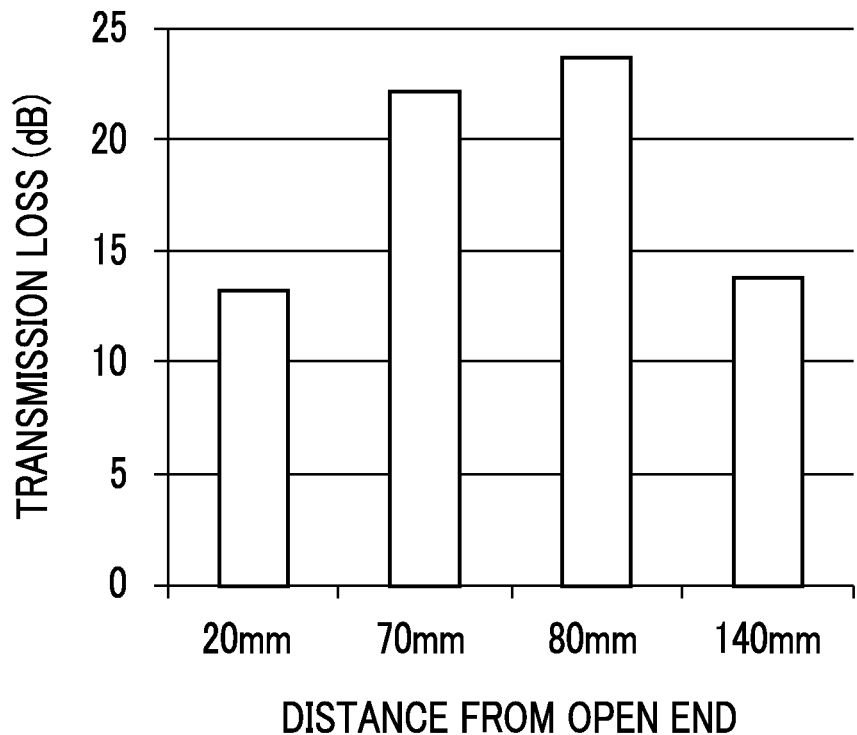
FIG. 14 is a graph showing a relationship between a distance from an open end and a transmission loss.

The transmission losses at 810 Hz in Examples 1 to 4 are shown in FIG. 14.

From FIG. 14, it can be seen that the silencing effect is obtained in any of the examples, that is, at any position of the silencing structure. In addition, it can be seen that the silencing effect changes greatly depending on the position of the silencing structure (position of the opening portion), and it is preferable that the opening portion of the silencing structure is disposed at the position of the antinode of the sound pressure.

From the above, it can be seen that the positioning accuracy of the silencing structure and the absence of positional deviation during use are important. In the present invention, it can be seen that since the frame (frame portion) of the silencing structure is formed integrally with the L-shaped duct (tubular portion), the positioning accuracy is high, and no positional deviation occurs, so that a high silencing effect is obtained.

Example 5

In the same manner as in Example 1, an L-shaped duct (tubular member) having a frame (height 20 mm) at positions of 80 mm and 100 mm from the open end was produced.

As a lid member, an acrylic plate having a width of 50 mm and a thickness of 5 mm, in which the length in the length direction of the first tube structure was the distance between the two frames+the frame thickness (26 mm in total), was prepared. A square through-hole of 6.3 mm×6.3 mm was formed in the center of the acrylic plate.

This lid member was fixed to the two frames with double-sided tape, whereby a silencing tubular structure body was produced.

A silencing structure thus formed is a Helmholtz resonator having a through-hole (opening portion) and a volume (hollow portion) on the back surface. The resonant frequency of this resonant structure is 810 Hz.

Example 6

A silencing tubular structure body was produced in the same manner as in Example 5, except that the positions of the two frames were respectively set to positions of 20 mm and 40 mm from the open end.

Example 7

A silencing tubular structure body was produced in the same manner as in Example 5, except that the positions of the two frames were respectively set to positions of 140 mm and 160 mm from the open end.

The acoustic performance of the silencing tubular structure bodies of Examples 5 to 7 was measured in the same manner as in Example 1. The transmission losses at 810 Hz are shown in FIG. 15.

Figure 15:
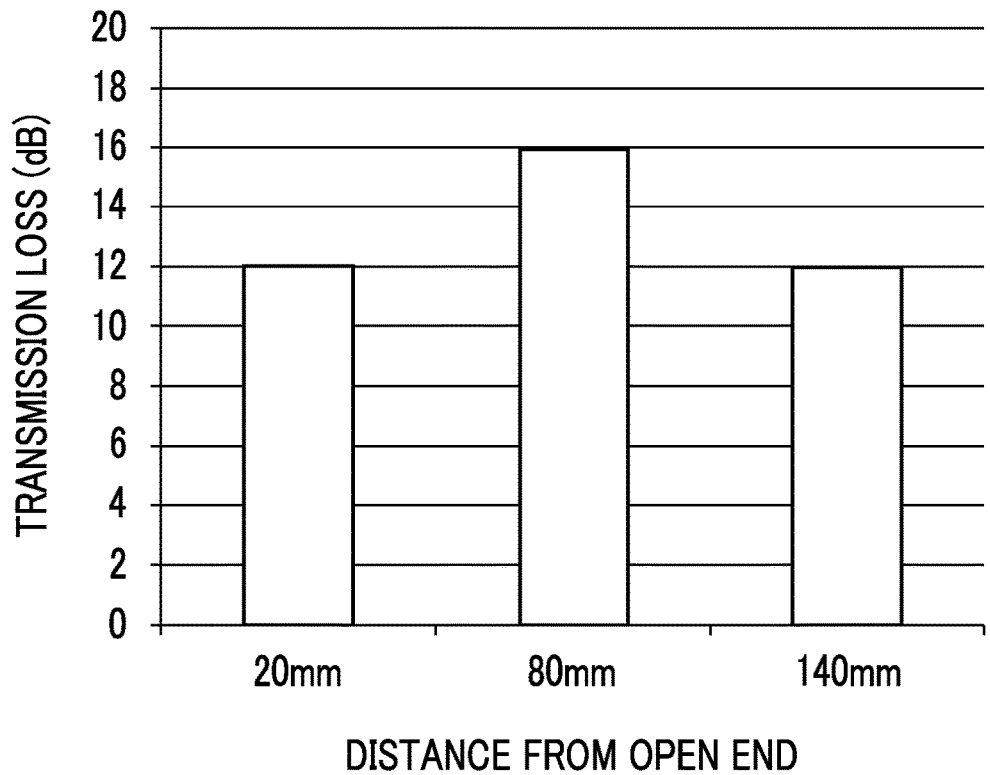
FIG. 15 is a graph showing a relationship between a distance from an open end and a transmission loss.

From FIG. 15, it can be seen that the silencing effect is obtained at any position of the silencing structure. In particular, it can be seen that the transmission loss of Example 5 (the position of 80 mm from the open end) in which the silencing structure is disposed at the position of the antinode of the sound pressure is large.

Example 8

A silencing tubular structure body was produced in the same manner as in Example 5, except that the through-hole formed in the lid member was set to 6.0 mm×6.0 mm.

Example 9

A silencing tubular structure body was produced in the same manner as in Example 5, except that the through-hole formed in the lid member was set to 6.6 mm×6.6 mm.

The acoustic performance of the silencing tubular structure bodies of Examples 8 and 9 was measured in the same manner as in Example 1. The measurement results of the transmission losses in Examples 5, 8, and 9 are shown in FIG. 16.

Figure 16:
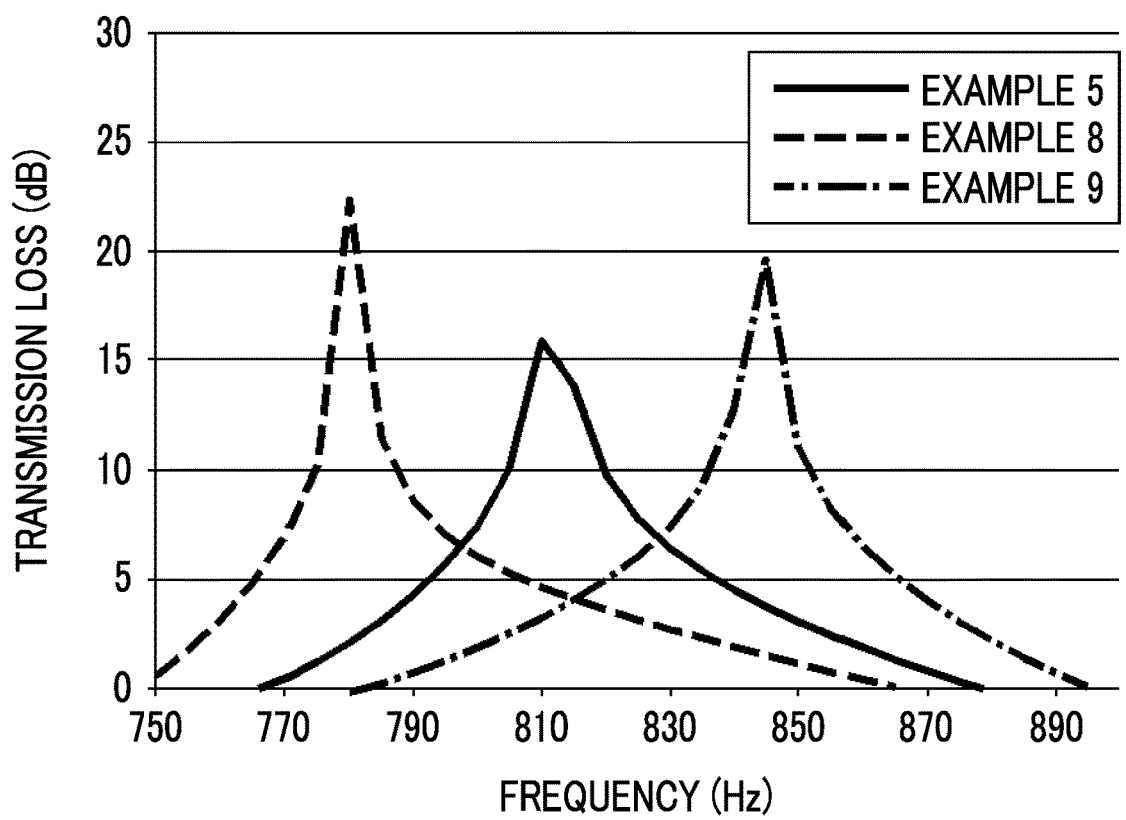
FIG. 16 is a graph showing a relationship between a frequency and a transmission loss.

From FIG. 16, it can be seen that the resonant frequency of Helmholtz resonance can be changed by changing the size of the through-hole formed in the lid member. In other words, it can be seen that the silencing tubular structure body of the embodiment of the present invention changes the resonant frequency of the resonant structure by changing the type of the lid member, thereby easily changing the frequency of the sound to be absorbed.

Example 10

An L-shaped duct (tubular member) was produced in the same manner as in Example 5 except that a configuration in which the positions of the two frames were respectively set to positions of 80 mm and 130 mm from the open end, the height of the frames was set to 32 mm, and two frames having a thickness of 2 mm and a height of 32 mm were provided on both end sides in the width direction between the two frames was adopted. That is, in the L-shaped duct, a frame portion having a rectangular (50 mm×46 mm) opening surrounded by the four frames was integrally formed.

As a lid member, a PET film (manufactured by Toray Industries, Inc.) having a width of 50 mm and a thickness of 75 μm, in which the length in the length direction of the first tube structure was the distance between the two frames+the frame thickness (56 mm in total), was prepared.

This lid member was fixed to the four frames with double-sided tape, whereby a silencing tubular structure body was produced.

A silencing structure thus formed is a membrane vibration type resonant structure capable of performing membrane vibration. The resonant frequency of this resonant structure is 810 Hz.

The acoustic performance of the silencing tubular structure body of Example 10 was measured in the same manner as in Example 1, and a transmission loss of 8.5 dB was obtained at 810 Hz. As described above, a duct could be silenced even using the membrane vibration.

From the above, the effect of the present invention is clear.

EXPLANATION OF REFERENCES 10 silencing tubular structure body
12 tubular member
14, 14a to 14e lid member
15 opening portion
16 tubular portion 18 frame portion
20, 20a to 20e silencing structure
22 opening portion
24 hollow portion
26 porous sound absorber

What is claimed is:

1. A silencing tubular structure body comprising:
a tubular member including a tubular portion having a tubular shape, and a frame portion having at least a part formed integrally with an inner peripheral surface side of the tubular portion; and
a lid member that is exchangeably disposed on an opening surface of the frame portion of the tubular member,
wherein the frame portion and the lid member form a resonant silencing structure,
the lid member is a plate-like member that is smaller than the opening surface of the frame portion and covers a part of the opening surface,
the silencing structure is a resonant structure having a hollow portion surrounded by the frame portion and the lid member, and an opening portion of the opening surface that is not covered by the lid member, and
the frequency band of the sound silencing structure can be changed by replacing the lid member.

2. A silencing tubular structure body comprising:
a tubular member including a tubular portion having a tubular shape, and a frame portion having at least a part formed integrally with an inner peripheral surface side of the tubular portion; and
a lid member that is exchangeably disposed on an opening surface of the frame portion of the tubular member,
wherein the frame portion and the lid member form a resonant silencing structure,
the lid member has an opening portion,
the silencing structure is a resonant structure having a hollow portion surrounded by the frame portion and the lid member, and an opening portion formed in the lid member, and
the frequency band of the sound silencing structure can be changed by replacing the lid member.

3. A silencing tubular structure body comprising:
a tubular member including a tubular portion having a tubular shape, and a frame portion having at least a part formed integrally with an inner peripheral surface side of the tubular portion; and
a lid member that is exchangeably disposed on an opening surface of the frame portion of the tubular member,
wherein the frame portion and the lid member form a resonant silencing structure,
the frame portion has an opening portion,
the silencing structure is a resonant structure having a hollow portion surrounded by the frame portion and the lid member, and an opening portion formed in the frame portion, and
the frequency band of the sound silencing structure can be changed by replacing the lid member.

4. The silencing tubular structure body according to claim 1,
wherein resonance in the resonant structure is air column resonance.

5. The silencing tubular structure body according to claim 1,
wherein resonance in the resonant structure is Helmholtz resonance.

6. The silencing tubular structure body according to claim 1,
wherein the lid member is a film-like member capable of performing membrane vibration, and
the silencing structure is a resonant structure in which the film-like member disposed on the opening surface of the frame portion performs membrane vibration.

7. The silencing tubular structure body according to claim 1,
wherein the resonant structure resonates with a sound in an audible range.

8. The silencing tubular structure body according to claim 1,
wherein the silencing structure is disposed at a position which is an antinode of a sound pressure of a sound resonating in the tubular portion.

9. The silencing tubular structure body according to claim 1,
wherein a material of the lid member is the same as a material of the frame portion.

10. The silencing tubular structure body according to claim 1,
wherein a porous sound absorber is present inside or outside the resonant silencing structure.

* * * * *